(12) United States Patent
Schoonmaker (10) Patent No.: US 10,821,945 B2
(45) Date of Patent: Nov. 3, 2020

(54) OUTRIGGER PAD ASSEMBLY HAVING A FORCE SENSOR

(71) Applicant: Manitowoc Crane Companies, LLC, Manitowoc, WI (US)

(72) Inventor: Stephen J. Schoonmaker, Chambersburg, PA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 61 days.

(21) Appl. No.: 16/290,133

(22) Filed: Mar. 1, 2019

(65) Prior Publication Data

US 2019/0270434 A1 Sep. 5, 2019

Related U.S. Application Data

(60) Provisional application No. 62/637,682, filed on Mar. 2, 2018.

(51) Int. Cl.
*B60S 9/04* (2006.01)
*G01L 5/00* (2006.01)
*B60S 9/02* (2006.01)
*B66C 23/78* (2006.01)

(52) U.S. Cl.
CPC . *B60S 9/04* (2013.01); *B60S 9/02* (2013.01); *B66C 23/78* (2013.01); *G01L 5/0038* (2013.01); *G01L 5/0061* (2013.01)

(58) Field of Classification Search
CPC . B60S 9/04; B60S 9/02; G01L 5/0061; G01L 5/0038; B66C 23/78
See application file for complete search history.

(56) References Cited

U.S. PATENT DOCUMENTS

| | | | | |
|---|---|---|---|---|
| 8,881,919 | B2* | 11/2014 | Benton | G01B 11/02 |
| | | | | 212/277 |
| 9,365,398 | B2 | 6/2016 | Benton et al. | |
| 9,550,475 | B1* | 1/2017 | Walker | B66F 11/044 |
| 10,308,487 | B2* | 6/2019 | Ost | B66C 23/905 |
| 2011/0062695 | A1* | 3/2011 | Bergemann | B66C 23/905 |
| | | | | 280/763.1 |
| 2014/0116975 | A1 | 5/2014 | Benton | |
| 2015/0210513 | A1 | 7/2015 | Mayr et al. | |

FOREIGN PATENT DOCUMENTS

| | | |
|---|---|---|
| DE | 102008058937 A1 | 11/2009 |
| EP | 2909127 B1 | 10/2016 |
| EP | 3096119 A1 | 11/2016 |

OTHER PUBLICATIONS

Extended European Search Report and Written Opinion issued by ISA/EPO in connection with EP 19160238 dated Aug. 27, 2019.

* cited by examiner

*Primary Examiner* — Darlene P Condra
(74) *Attorney, Agent, or Firm* — Levenfeld Pearlstein, LLC (57) ABSTRACT

An outrigger pad assembly includes a base having a bottom surface for engaging an underlying support surface and a top surface opposite to the bottom surface, a force sensor mounted to the base, and an interface body. The interface body includes a lower cavity at least partially defined by a first inner sidewall, an upper cavity at least partially defined by a second inner sidewall, and a coupling body having a latch configured for selective with an outrigger jack. The force sensor is disposed in the lower cavity in sliding contact with the first inner sidewall such that the interface body is movable relative to the force sensor. The outrigger pad assembly may be part of an outrigger assembly of a lifting vehicle.

14 Claims, 7 Drawing Sheets

OUTRIGGER PAD ASSEMBLY HAVING A FORCE SENSOR

BACKGROUND

The present disclosure relates generally to an outrigger pad assembly, and in particular, an outrigger pad assembly having a force sensor for measuring a force from the ground to the outrigger pad assembly.

A lifting vehicle, such as a mobile crane, a truck crane, an industrial crane, a boom truck and the like, may include a set of outrigger assemblies. Such lifting vehicles are typically supported on tires in rolling contact with the ground during transit and are supported by the outrigger assemblies during a lifting operation.

A conventional outrigger assembly is deployed from a platform of the lifting vehicle to engage the ground. Such an assembly typically includes an outrigger jack and an outrigger pad at a free end of the outrigger jack. The outrigger jack is configured for movement in a vertical direction. The outrigger jack may be affixed to free end of a horizontally extending outrigger beam. The outrigger assembly is deployed by lowering the outrigger jack to bring the outrigger pad into contact with the ground, or similar support surface. In a partially deployed condition, the tires may still be in contact with the ground at the same time as the outrigger pad. Accordingly, the lifting vehicle may be supported by a combination of the tires and the partially deployed outrigger assembly.

For many lifting operations, the outrigger assembly may be moved to a fully deployed condition by continued lowering, or vertical movement, of the outrigger jack relative to the platform of the lifting vehicle. This continued vertical movement, with the outrigger pad in contact with the ground, causes the tires of the lifting vehicle to be raised from the ground due to a reaction force from the ground to the outrigger pad. Accordingly, the lifting vehicle and any load suspended therefrom can be completely supported on the outrigger assemblies.

Traditionally, an operator determines proper deployment of the outrigger assembly by visual inspection or length measurement of the outrigger components. For instance, an operator may visually confirm that an outrigger pad engages the ground, or further, that the tires of the lifting vehicle have been lifted from the ground. However, visual inspection typically requires additional personnel or spotters, or that the operator leaves the lifting vehicle. Length measurement requires sensors and measurement equipment, such as string pots, which may not be sufficiently durable for use on or in moving components or in construction environments and may be come unreliable. In addition, length measurement of, for example, an outrigger jack, does not necessarily confirm that the outrigger jack or outrigger pad has engaged the ground to support the lifting vehicle. For instance, if the outrigger jack is positioned over depression in the ground, the jack may be fully extended (lowered) without the outrigger pad contacting the ground.

Another way in which proper outrigger assembly deployment may be determined is by measuring a force in the outrigger assembly. For example, as the outrigger assembly begins to support the weight of the lifting vehicle, the measured force in the outrigger assembly will increase. In U.S. Pat. No. 9,365,398 to Benton et al., commonly owned with the present application and incorporated herein by reference, in its entirety, an outrigger system uses a load sensor, such as a strain gauge, to measure the force in the outrigger assembly. The load sensor is disposed in a leg of the outrigger jack and is configured to measure a force in the leg. Alternatively, the load sensor may be placed on or within the outrigger pad. The load sensor is configured to output a representation of the strain measured at the leg of the outrigger jack. The strain is related to the load on the leg and the representation of the strain is also a representation of the load on the outrigger pad. Thus, in U.S. Pat. No. 9,365,398, the measured force is an internal force at a joint of the outrigger pad and the outrigger jack.

However, as the outrigger assembly is deployed and begins to support the weight of the lifting vehicle and any load suspended from the lifting vehicle, the horizontal outrigger beam begins to flex. As a result, the force transmitted from the outrigger beam to the outrigger jack is not entirely vertical, i.e., the force includes a horizontal component. A load sensor of the type described in U.S. Pat. No. 9,365,398, for example, measures the resultant force based on the vertical and horizontal components at the joint of the outrigger jack and the outrigger pad. While such a force measurement accurately reflects a total force within the joint of the outrigger leg and the outrigger pad, the measured resultant force does not reflect a normal force component representative of a load being supported by the outrigger pad.

In addition, the outrigger pad described in U.S. Pat. No. 9,365,398 is designed for use with a particular outrigger jack having a specifically machined leg configuration. Thus, use of such an outrigger pad requires installation or replacement of conventional outrigger jacks with those described in U.S. Pat. No. 9,365,398. Other attempts to implement force sensors in outrigger assemblies have been made. However, it has been found that use of force sensors requires extensive retrofitting or complete replacement of the outrigger jack in order to accommodate the force sensor.

Ball-shaped force sensors are generally known that are configured to measure a normal component of a non-normal force. However, outrigger assemblies on lifting vehicles have not been developed to incorporate such a sensor, nor are outrigger assemblies currently designed in way which can accept a ball-shaped sensor for measuring a normal component of a force at an outrigger pad.

Accordingly, it is desirable to provide an outrigger pad assembly, configured for use with an outrigger jack, which may measure a normal force applied to the outrigger pad from the ground with improved accuracy.

SUMMARY

According to one aspect, an outrigger pad assembly includes a base having a bottom surface for engaging an underlying support surface and a top surface opposite to the bottom surface, a force sensor mounted on the top surface of the base, and an interface body. The interface body includes a lower cavity defined at least partially by a first inner sidewall, an upper cavity defined at least partially by a second inner sidewall, and a coupling body having a latch configured for selective coupling to and uncoupling from an outrigger jack. The force sensor is disposed in the lower cavity in sliding contact with the first inner sidewall such that the interface body is movable relative to the force sensor.

According to another aspect, an outrigger assembly includes an outrigger jack configured for movement in a vertical direction, the outrigger jack having a free end, and an outrigger pad assembly releasably coupled to the outrigger jack at the free end. The outrigger pad assembly includes a base having a bottom surface for contacting an underlying support surface and a top surface opposite to the bottom surface, a force sensor on the top surface of the base, and an interface body. The interface body includes a lower cavity defined at least partially by a first inner sidewall, an upper cavity defined at least partially by a second inner sidewall, and a coupling body having a latch configured to releasably engage a catch on the outrigger jack. The force sensor is disposed in the lower cavity in sliding contact with the first inner sidewall such that the interface body is movable relative to the sensor and the free end of the outrigger jack is disposed in the upper cavity.

According to still another aspect, a lifting vehicle includes a carrier, a superstructure mounted on the carrier, the superstructure having a lifting implement, and an outrigger jack connected to the carrier. The outrigger jack is configured for vertical movement relative to the carrier. The lifting vehicle further includes an interface body coupled to the outrigger jack, the interface body having a lower cavity defined at least partially by a first inner sidewall and an upper cavity defined at least partially by a second inner sidewall. A free end of the outrigger jack is disposed in the upper cavity. The lifting vehicle further includes an outrigger pad having a base and a force sensor mounted to the base. The force sensor is disposed in the lower cavity in sliding contact with the first inner sidewall such that the interface body is movable relative to the sensor.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
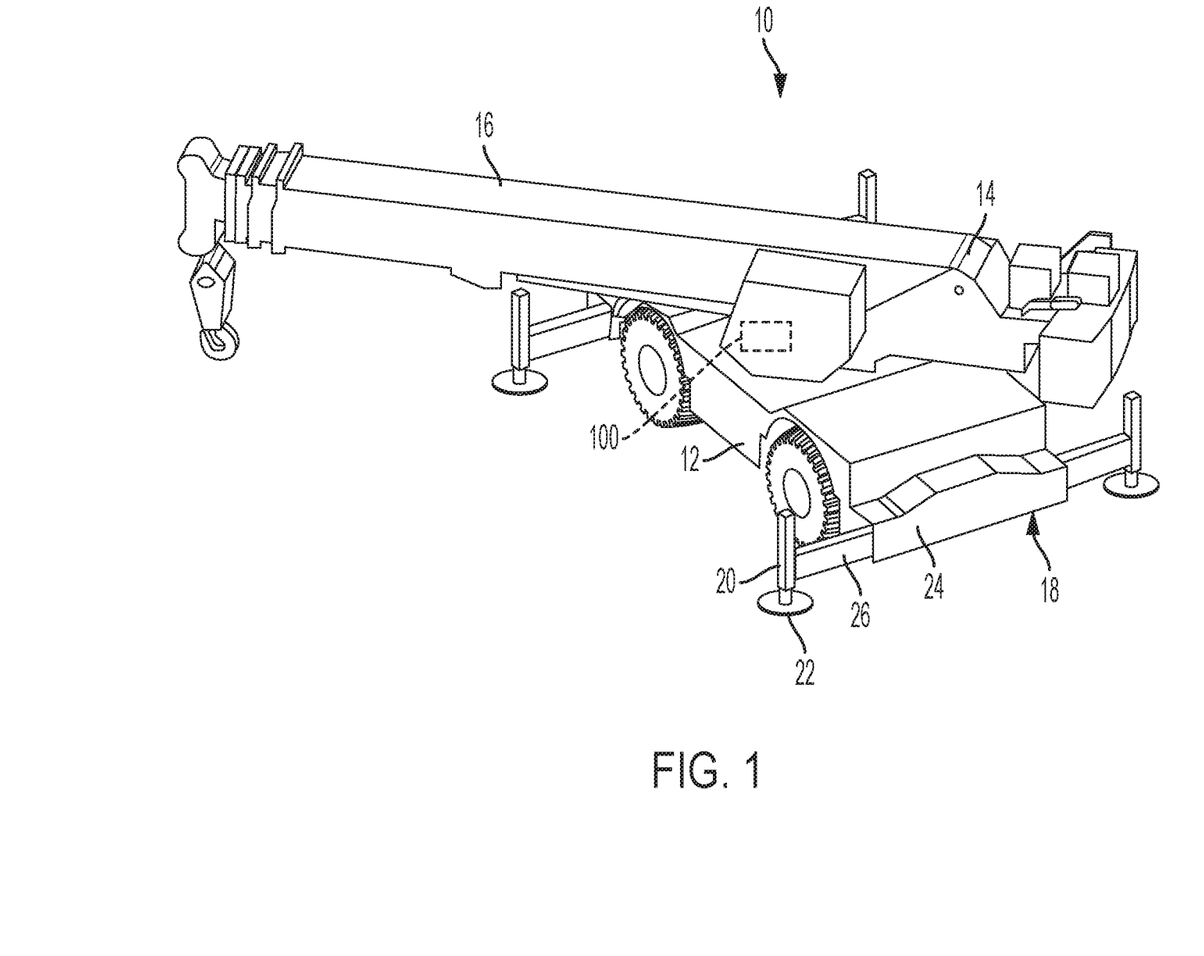
FIG. 1 is a perspective view of a lifting vehicle having an outrigger assembly according to an embodiment.

FIG. 1 is a perspective view of a lifting vehicle 10 according to an embodiment described herein. A lifting vehicle 10 may include, for example, a carrier 12 and a superstructure 14 mounted on the carrier 12. The superstructure 14 includes, for example, a lifting implement 16, such as a boom. In one embodiment, the superstructure 14 may be rotatably mounted on the carrier 12. The lifting vehicle 10 may be, for example, a mobile crane such as a rough-terrain crane, all-terrain crane, truck-mounted crane, an industrial crane or a boom truck. However, the lifting vehicle is not limited thereto. For example, the lifting vehicle could be a utility truck or other construction vehicle.

Referring still to FIG. 1, the lifting vehicle 10 also includes an outrigger assembly 18. The outrigger assembly 18 is fixed to the carrier 12. In one embodiment, the outrigger assembly 18 includes an outrigger jack 20. The outrigger jack 20 is configured for vertical or substantially vertical movement relative to the carrier 12. For example, the outrigger jack 20 may be extended, or lowered, toward the ground or other underlying support surface, to engage the ground, either directly or indirectly. When extended to engage the ground, the outrigger jack 20 is configured to support at least a portion of the weight of the lifting vehicle 10 and a load (not shown) being lifted by the lifting vehicle. Thus, the weight of the lifting vehicle 10 results in a force being applied to the outrigger jack 20 when the outrigger jack 20 is deployed. Additional forces may be applied to the outrigger jack 20 from a weight of the load being lifted and moments resulting from the geometry of the outrigger assembly 18, the lifting vehicle 10, a support geometry of the lifting vehicle 10 (e.g., based on deployment of multiple outrigger assemblies 18) and a position of the load being lifted. The outrigger jack 20 may be retracted, or raised, from the extended (lowered) position to a position where it is disengaged from the ground or other support surface.

The outrigger assembly 18 may also include an outrigger pad assembly 22 disposed at a free end of the outrigger jack 20. Accordingly, in the extended condition, the outrigger pad assembly 22 may engage the ground or other underlying support surface and support at least a portion of the weight of the lifting vehicle and any load being lifted by the vehicle 10. Thus, the force applied to the outrigger jack 20 is transmitted to the outrigger pad assembly 22 when the outrigger assembly 18 is deployed to at least partially support the lifting vehicle 10. In one embodiment, the outrigger assembly 18 may extend in a substantially horizontal direction as well. For example, the outrigger assembly 18 may include a box 24 fixed to the carrier 12 and an arm 26 mounted to the box 24 for telescoping movement relative to the box 24. The outrigger jack 20 may be mounted at a free end of the arm 26 so as to be movable in the horizontal direction with the arm 26.

Figure 2:
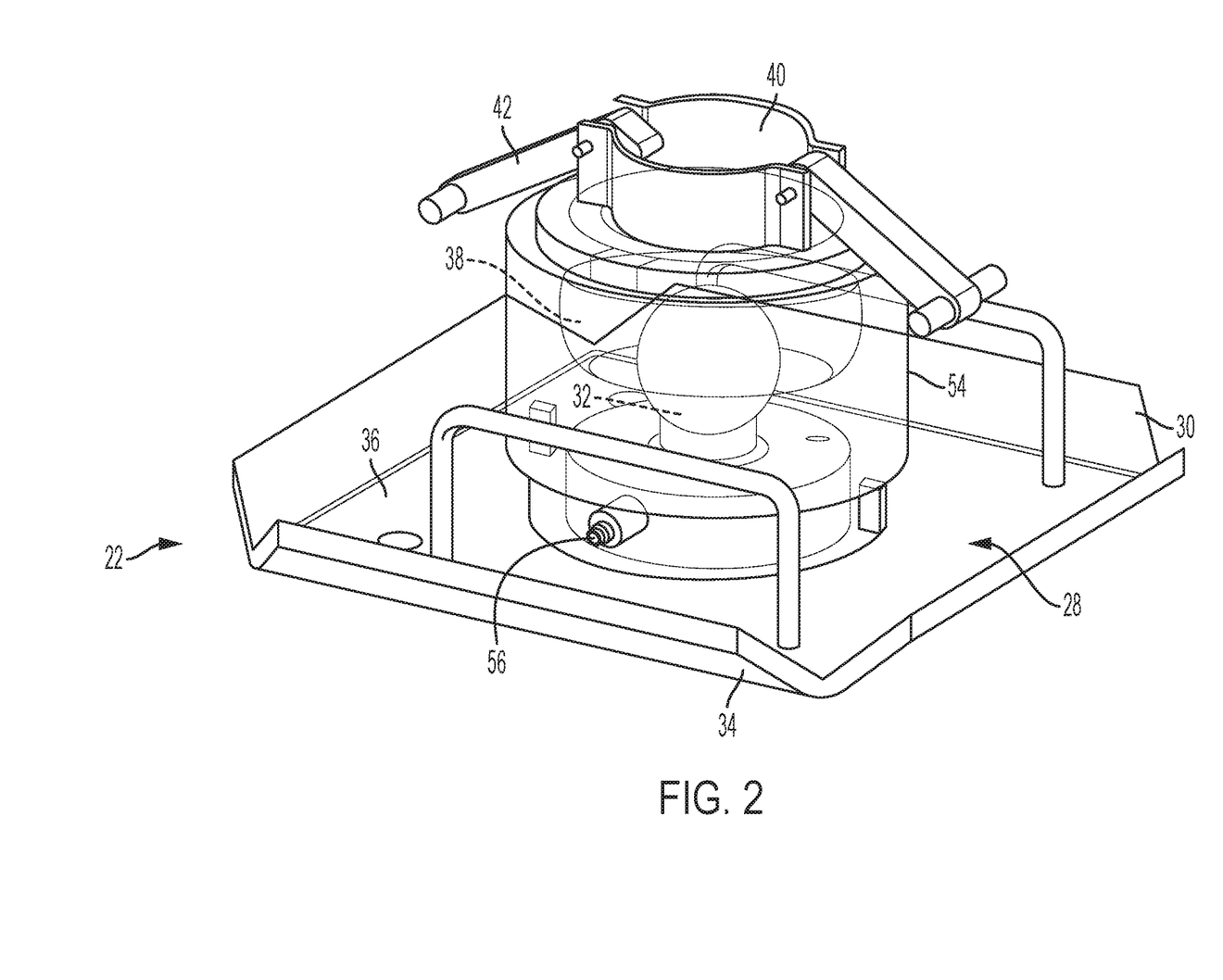
FIG. 2 is a perspective view showing an outrigger pad assembly according to an embodiment.
Figure 3:
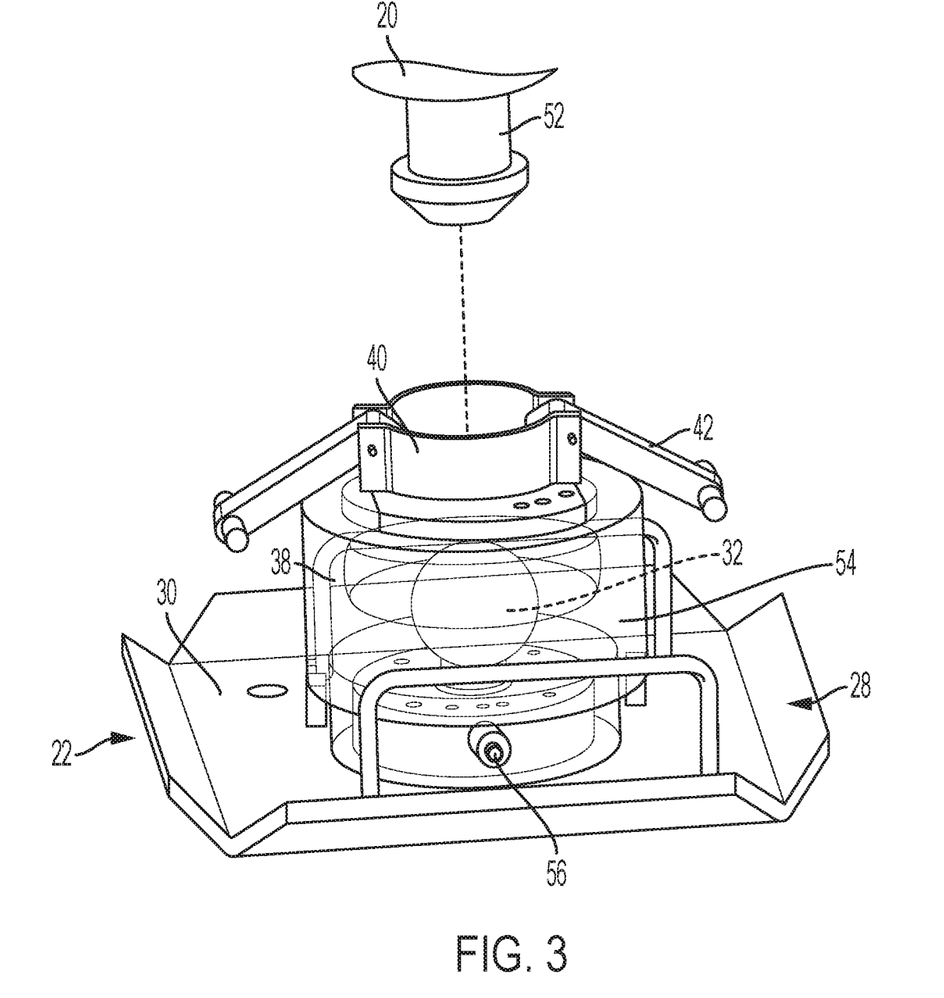
FIG. 3 is a perspective view showing the outrigger pad assembly of FIG. 2 together with a portion of an outrigger jack, according to an embodiment.

FIG. 2 is a transparent, perspective view the outrigger pad assembly 22 according to an embodiment, and FIG. 3 is a transparent, perspective view of the outrigger pad assembly 22 with a portion of the outrigger jack 20 uncoupled from the outrigger pad assembly 22, according to an embodiment. Referring to FIGS. 2 and 3, the outrigger pad assembly 22 includes an outrigger pad 28 having a base 30 and a sensor 32, such as a force sensor, disposed on the base 30. The base 30 has a bottom surface 34 configured to engage the ground and a top surface 36 from which the sensor 32 may extend and/or to which the sensor 32 may be mounted using known, suitable mounting or fastening techniques.

In one embodiment, the sensor 32 is a ball-shaped force sensor. That is, the sensor 32 may be substantially spherical in shape and is configured to measure a force applied at the outrigger pad 28. For example, the ball-shaped force sensor 32 is configured to measure a normal component of the force applied at the outrigger pad 28 from the outrigger jack 20. The measure normal force component corresponds to a force from the ground to the outrigger pad, i.e., a reaction force due to the outrigger pad 28 supporting or partially supporting a weight of the lifting vehicle 10 and any load suspended from the lifting vehicle 10.

The outrigger pad assembly 22 also includes an interface body 38. The interface body 38, at one end, is configured to engage the sensor 32 and is movable relative to the sensor 32 through sliding contact on a surface of the sensor 32. In one embodiment, the interface body 38 is movable relative to the sensor 32 in a manner similar or identical to movements in ball-and-socket joints. For example, the interface body 38 may be rotatable or movable on or about an infinite number of axes having a common center point within the ball-shaped sensor 32. At another end, the interface body 38 is configured to receive a free end of, and/or be coupled to, the outrigger jack 20.

Referring still to FIGS. 2 and 3, and with particular reference to FIG. 3, the outrigger pad assembly 22 may also include a coupling body 40 having a latch 42 configured for releasable engagement with the outrigger jack 20. In one embodiment, the latch 42 includes one or more rotatable spring-loaded arms. A portion of the spring-loaded arm is rotatable into and out of engagement with a corresponding catch 52 on the outrigger jack 20 to couple and uncouple the outrigger pad assembly 22 to and from the outrigger jack 20. In one embodiment, the spring-loaded arm is biased into engagement with the outrigger jack 20. Other known, suitable latches are envisioned for coupling and uncoupling the outrigger pad assembly 22 to and from the outrigger jack 20 as well.

Figure 4:
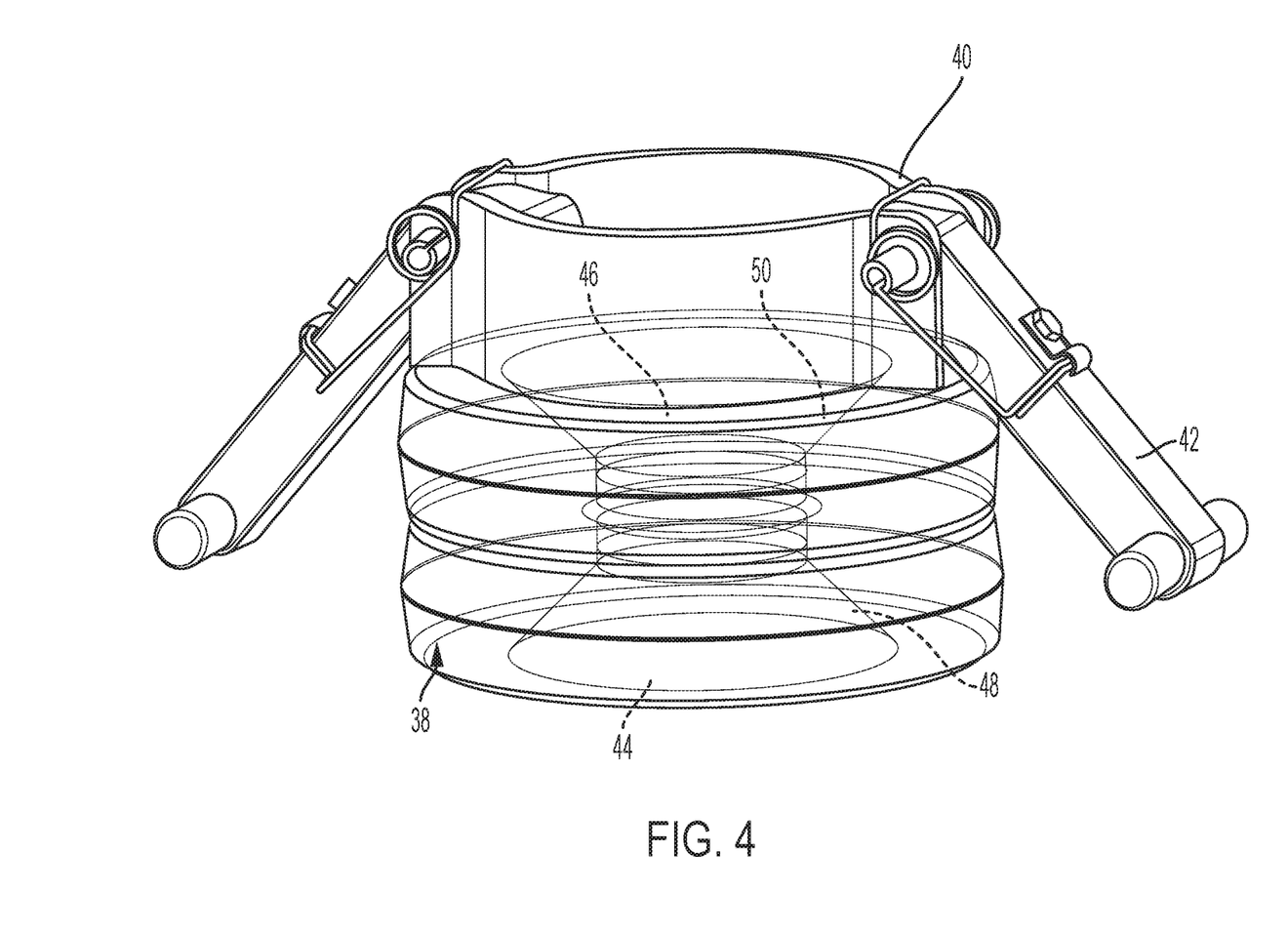
FIG. 4 is a perspective view of an interface body of the outrigger pad assembly of FIG. 2, according to an embodiment.

FIG. 4 is a transparent, perspective view of the interface body 38, according to an embodiment described herein. In one embodiment, the interface body 38 includes a lower cavity 44 configured to receive the sensor 32 and an upper cavity 46 configured to receive a portion of the outrigger jack 20. The lower cavity 44 is defined, at least in part, by a first inner sidewall 48 of the interface body 38 and the upper cavity 46 is defined, at least in part, by a second inner sidewall 50 of the interface body 38. In one embodiment, the upper and lower cavities 44, 46 are axially aligned with one another. Further, the upper and lower cavities 44, 46 may be aligned on an axis of the interface body 38.

In one embodiment, the lower cavity 44 may decrease in width moving axially inward within the interface body 38. For example, in one embodiment, the first inner sidewall 48 defining the lower cavity 44 may be substantially frustoconical or conical. In another embodiment, the first inner sidewall 48 may be spherical or parabolic. In still another embodiment, the first inner sidewall 48 may be cylindrical or stepped. Other suitable profiles and shapes are envisioned as well.

In one embodiment, the upper cavity 46 may be formed similarly to the lower cavity 44. For example, a width of the upper cavity 46 may decrease moving axially inward within the interface body 38. Similarly, the second inner sidewall 50 may be frustoconical, conical, spherical, parabolic, cylindrical, stepped or the like. It is understood, however, that the upper cavity 46 and the lower cavity 44 may be formed differently from one another.

Figure 5:
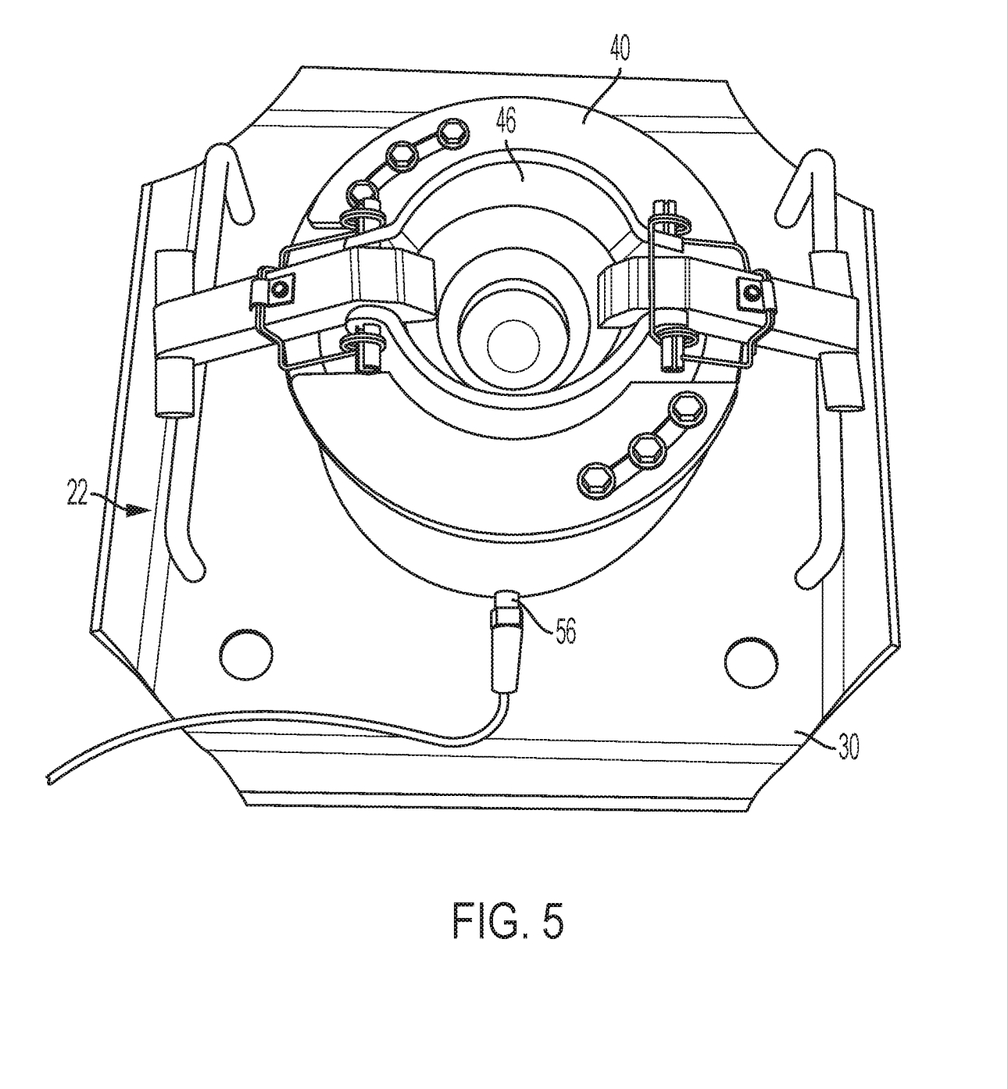
FIG. 5 is a top perspective view showing the outrigger pad assembly according to an embodiment.

FIG. 5 is a top perspective view of the outrigger pad assembly 22, according to an embodiment. Referring to FIGS. 2-5, the coupling body 40 may be fixed to, or formed as part of, the interface body 38. The upper cavity 46 may extend into the coupling body 40 for receipt of the outrigger jack 20. In one embodiment, a portion of the upper cavity 46 formed in the coupling body 40 may be substantially cylindrical in shape. The coupling body 40 is configured to releasably couple the outrigger pad assembly 22 to the outrigger jack 20 by way of the latch 42, as described above.

Figure 6:
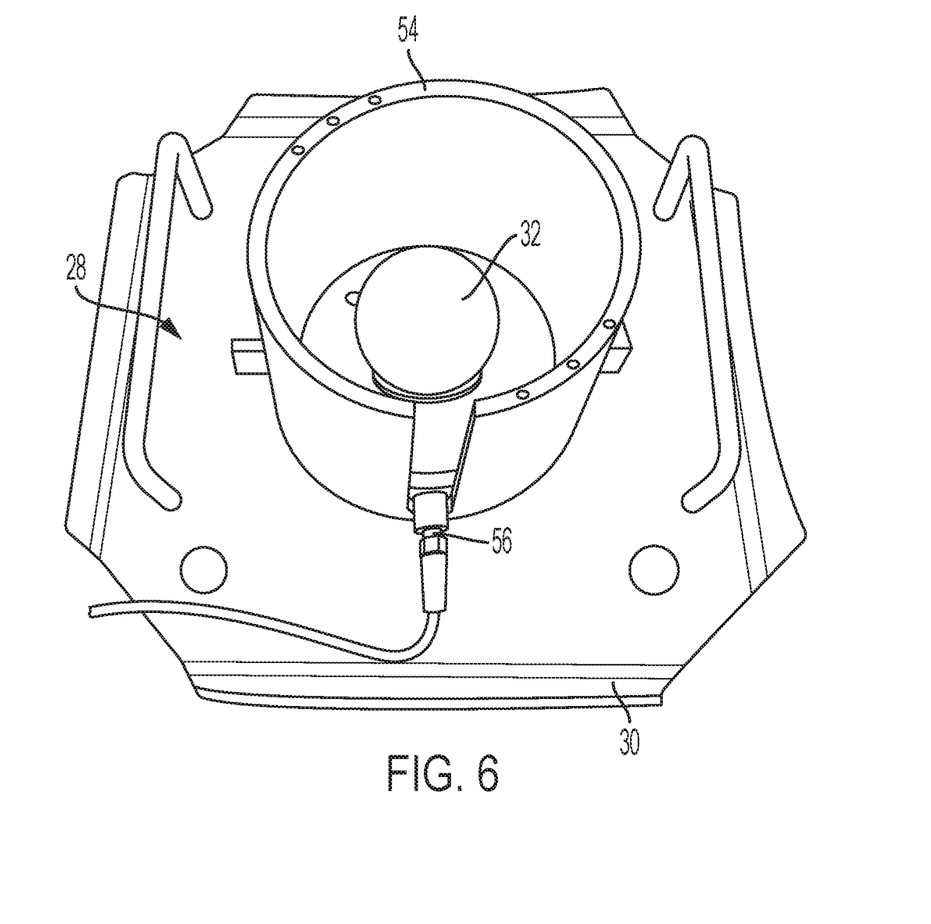
FIG. 6 is a top perspective view of an outrigger pad, according to an embodiment.

FIG. 6 is a top, perspective view of the outrigger pad 28, according to an embodiment. As best shown in FIG. 6, in one embodiment, the outrigger pad assembly 22 may include a housing 54, which may be formed as part of the outrigger pad 28. With reference to FIGS. 2, 3, 5 and 6, in one embodiment, the interface body 38 and at least a portion of the sensor 32 may be disposed in the housing 54. In one embodiment, the coupling body 40 may be fixed to the housing 54. The housing 54 may be formed integrally with the base 30 or fixed to the base 30 using suitable fastening techniques, such as welding, bolting and the like. The housing 54 may be substantially cylindrical.

Referring still to FIGS. 2, 3, 5 and 6, the sensor 32 may include, or be operably connected to, a communication interface 56 configured to transmit sensor data, such as force measurements, recorded by the sensor 32. The communication interface 56 may be a known wired or wireless interface communicating using suitable, known communication protocols.

Figure 7:
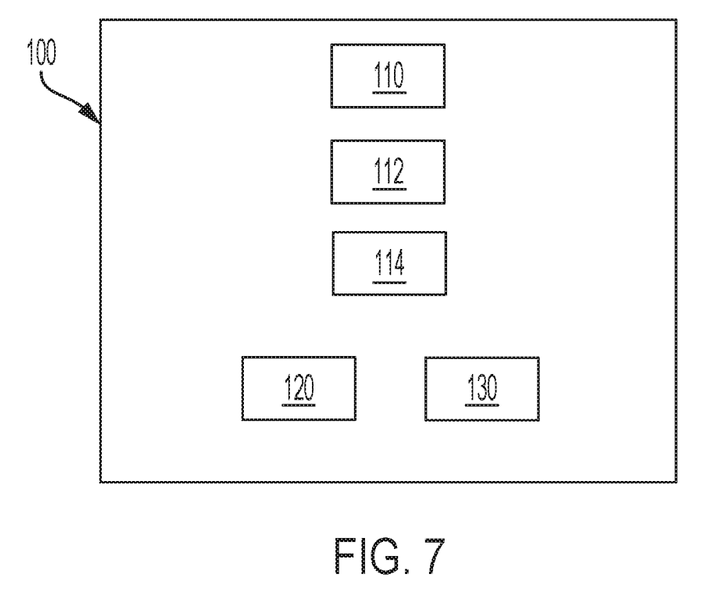
FIG. 7 is a block diagram showing an example of a crane control system according to an embodiment.

FIG. 7 is a block diagram showing an example of a crane control system 100, according to an embodiment. In one embodiment, as shown schematically in FIG. 1, for example, the crane control system 100 may be located at an operator's cab of the lifting vehicle 10. However, the present application is not limited to such a configuration. For example, the crane control system 100 may be positioned elsewhere on the lifting vehicle 10, remote from vehicle 10, or be distributed among multiple devices that are local, remote or both, to the vehicle 10. In one embodiment, different components of the crane control system 100, including conventional components which may not be specifically described herein, may be located at different positions on the lifting vehicle 10, and/or remote therefrom, and may be operably connected to one another using known connections and communication interfaces. The crane control system 100 may be embodied as part of a computer, including, but not limited to, an on-board computer, a centralized remote computer system, and/or a portable electronic device. Referring to FIG. 7, the crane control system 100 may include, for example, a computer-readable storage medium 110, a processor 112, and an input/output (I/O) module 114. The computer-readable storage medium 110 stores program instructions which may be executed by the processor 112 and may be non-transitory. In response to executing the program instructions, the processor 112 may control one or more actuators for controlling movement (e.g., starting, stopping, accelerating, decelerating, or preventing the same) of various crane components. In one embodiment, the sensor 32 is operably connected to the crane control system 100 and is configured to transmit the sensor data, e.g., measured forces, to the crane control system 100, for example, via the communication interface 56 and the I/O module 114.

The crane control system 100 may also include, or be operably connected to, one or more of a working range limiter ("WRL") 120 and a rated capacity limiter ("RCL") 130. In one embodiment, the crane control system 100, for example, at the WRL 120 and/or the RCL 130 may calculate a load chart and/or working range limits, or otherwise determine load limits (for example, based on stored load charts or other data), and control movement of one or more crane components based on the load charts, load limits and/or range limits. In one embodiment, the load chart, load limits and/or working range limits may be determined based on the sensor data measured by the force sensor 32. Alternatively, or in addition, movement of the one or more crane components may also be controlled based, at least in part, on the sensor data measured by the force sensor 32 and transmitted to the crane control system 100. In one embodiment, the lifting vehicle 10 include a plurality of outrigger assemblies 18 and the crane control system 100 is configured to receive sensor data from force sensors 32 of the plurality of outrigger assemblies 18.

Accordingly, in the embodiments above, an outrigger assembly 18 on a lifting vehicle 10 may be deployed, for example, before a lifting operation is carried out by the lifting vehicle 10. With the outrigger assembly 18 deployed, the outrigger jack 20 is extended, or lowered, and the outrigger pad assembly 22 engages the ground or other underlying support surface. Thus, the outrigger pad assembly 22 can support at least a portion of the weight of the lifting device 10 and any load being lifted by the lifting device. A force from the weight of the lifting device 10 and the load being lifted are transmitted to the outrigger pad assembly 22. A reaction force from the ground or other underlying support surface to the outrigger pad 28 in a direction normal to the outrigger pad 28 corresponds to a load being supported by the outrigger pad 28. The sensor 32 is configured to measure the force on the outrigger pad 28 in the normal direction. Accordingly, at least a portion of a weight of the lifting vehicle 10 and suspended load being lifted, may be measured by the sensor 32. For example, a total weight of the lifting vehicle 10 and a load being lifted may be determined based on sensor data from force sensors 32 in each outrigger assembly 18.

The sensor data, including the measured normal force on the outrigger pad assembly 22, may be transmitted to the crane control system 100. By way of the sensor data, a force at an outrigger pad assembly 22 may be determined substantially in real-time at the crane control system 100. With the force at the outrigger pad assembly 22 known, proper outrigger deployment may be confirmed or verified at the crane control system 100 or by an operator of the lifting vehicle 10. For example, the measured force may be compared to baseline forces that are expected to occur at the outrigger pad assembly 22, based on the weight of the lifting vehicle 10, the load being lifted and other relevant factors, such as the crane configuration, that will be appreciated by those having skill in the art. The baseline forces may be calculated and/or stored in the crane control system 100 and the crane control system 100 may carry out the comparison.

The force at the outrigger pad assembly 22 may also be used to confirm or verify operation of the lifting vehicle within the working range limits and load limits. For example, the measured force at the outrigger pad assembly 22 may be compared to maximum allowable force for the particular pad assembly 22. The maximum allowable force may be calculated and/or stored in the crane control system 100, and may be based on, for example, a current configuration of the lifting vehicle 10. The current configuration may take into account, for example, current outrigger extension length, boom lift angle, boom swing angle and boom length. The crane control system 100 may also carry out the comparison and control movement of crane components in response to the comparison to maintain the lifting vehicle within the working range limits.

Further, in the embodiments described above, the outrigger pad assembly 22 may be removably coupled to conventional outrigger jacks with little or no retrofitting necessary. Thus, the outrigger pad assembly 22 described herein may be used together with many existing outrigger jacks without need for retrofit or replacement of the outrigger jacks. As such, installation time, costs, labor and equipment may be reduced or limited.

In one embodiment, the lifting vehicle 10 may include four similarly formed outrigger assemblies 18. In one desired lifting operation, each outrigger assembly 18 is fully deployed such that respective outrigger pads 28 are in contact with the ground and tires of the lifting vehicle 10 are lifted from the ground. In this configuration, the full weight of the lifting vehicle 10 and any suspended load may be supported on the outrigger pads 28. By measuring the normal component of a force at each outrigger pad 28, a more accurate determination of the load supported at each outrigger pad 28 may be made. In addition, through use of the sensor 32 described in the embodiments above, a normal component of the force at the outrigger pad 28 may be measured even when the outrigger box 24/arm 26 is deflected under the weight of the lifting vehicle 10, and the outrigger jack 20 extends in a direction other than normal to the outrigger pad 28.

It is understood the various features from any of the embodiments above are usable together with the other embodiments described herein. Further, it is understood that same or similar terminology used across the different embodiments above refers to the same or similar component, with the exception of any differences described or shown in the figures.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. An outrigger pad assembly comprising:
   a base having a bottom surface for engaging an underlying support surface and a top surface opposite to the bottom surface;
   a force sensor disposed on the top surface of the base;
   an interface body comprising:
      a lower cavity defined at least partially by a first inner sidewall;
      an upper cavity defined at least partially by a second inner sidewall; and
      a coupling body having a latch configured for selective coupling to and uncoupling from an outrigger jack;
   wherein the force sensor is disposed in the lower cavity in sliding contact with the first inner sidewall such that the interface body is movable relative to the force sensor.

2. The outrigger pad assembly of claim 1, wherein the force sensor is a ball-shaped force sensor.

3. The outrigger pad assembly of claim 2, wherein the lower cavity is frustoconical.

4. The outrigger pad assembly of claim 1, wherein the upper cavity is frustoconical.

5. The outrigger pad assembly of claim 1, wherein the force sensor includes a communication interface to transmit sensor data.

6. An outrigger assembly comprising:
an outrigger jack configured for movement in a vertical direction, the outrigger jack having a free end;
an outrigger pad assembly releasably coupled to the outrigger jack at the free end, the outrigger pad assembly comprising:
   a base having a bottom surface for contacting an underlying support surface and a top surface opposite to the bottom surface;
   a force sensor on the top surface of the base;
   an interface body comprising:
      a lower cavity defined at least partially by a first inner sidewall;
      an upper cavity defined at least partially by a second inner sidewall; and
      a coupling body having a latch configured to releasably engage a catch on the outrigger jack;
   wherein the force sensor is disposed in the lower cavity in sliding contact with the first inner sidewall such that the interface body is movable relative to the force sensor and the free end of the outrigger jack is disposed in the upper cavity.

7. The outrigger assembly of claim 6, wherein the force sensor is a ball-shaped force sensor and includes a communication interface to transmit sensor data.

8. The outrigger assembly of claim 7, wherein the lower cavity is frustoconical.

9. The outrigger assembly of claim 6, wherein the coupling body is ring-shaped and the upper cavity extends through the coupling body.

10. The outrigger assembly of claim 6, further comprising an outrigger box and an outrigger arm telescopically mounted to the outrigger box and configured for telescoping movement relative to the outrigger box, wherein the outrigger jack is mounted at a free end of the outrigger arm.

11. A lifting vehicle comprising:
a carrier;
a superstructure mounted on the carrier, the superstructure having a lifting implement;
an outrigger jack connected to the carrier, the outrigger jack configured for vertical movement relative to the carrier;
an interface body coupled to the outrigger jack, the interface body having a lower cavity defined at least partially by a first inner sidewall and an upper cavity defined at least partially by a second inner sidewall, wherein a free end of the outrigger jack is disposed in the upper cavity; and
an outrigger pad having a base and a force sensor mounted to the base, wherein the force sensor is disposed in the lower cavity in sliding contact with the first inner sidewall such that the interface body is movable relative to the force sensor.

12. The lifting vehicle of claim 11, wherein the force sensor is a ball-shaped force sensor and includes a communication interface to transmit sensor data.

13. The lifting vehicle of claim 12, further comprising a crane control system, wherein the crane control system is communicably connected to the sensor to receive the sensor data.

14. The lifting vehicle of claim 11, wherein the interface body is coupled to the outrigger jack with a spring-loaded latch.

* * * * *